(No Model.) 7 Sheets—Sheet 1.

H. H. BUFFUM.
NAILING MACHINE.

No. 562,703. Patented June 23, 1896.

WITNESSES:
A. D. Harrison.
A. D. Adams.

INVENTOR:
H. H. Buffum
Wright Brown & Quinby
attys.

(No Model.) 7 Sheets—Sheet 5.

H. H. BUFFUM.
NAILING MACHINE.

No. 562,703. Patented June 23, 1896.

WITNESSES:
INVENTOR:

(No Model.) 7 Sheets—Sheet 6.

H. H. BUFFUM.
NAILING MACHINE.

No. 562,703. Patented June 23, 1896.

WITNESSES:
A. D. Harrison,
A. D. Adams.

INVENTOR:
H. H. Buffum
by Wright, Brown & Quinby
attys.

(No Model.) 7 Sheets—Sheet 7.

H. H. BUFFUM.
NAILING MACHINE.

No. 562,703. Patented June 23, 1896.

WITNESSES:
A. D. Harrison.
A. D. Adams.

INVENTOR
H. H. Buffum

UNITED STATES PATENT OFFICE.

HERBERT H. BUFFUM, OF ABINGTON, MASSACHUSETTS.

NAILING-MACHINE.

SPECIFICATION forming part of Letters Patent No. 562,703, dated June 23, 1896.

Application filed January 7, 1896. Serial No. 574,578. (No model.)

*To all whom it may concern:*

Be it known that I, HERBERT H. BUFFUM, of Abington, in the county of Plymouth and State of Massachusetts, have invented certain new and useful Improvements in Nailing-Machines, of which the following is a specification.

This invention relates particularly to slug making and driving machines, by cutting a strip of metal transversely, and it has for its object to provide a simple, durable, and rapidly-operating machine of this class adapted to cut a strip into wedge-shaped slugs without waste of metal and without previous punching or cutting of the strip; and to these ends the invention consists in the improvements which I will now proceed to describe and claim.

Of the accompanying drawings, forming a part of this specification, Figs. 1$^a$, 1$^b$, and 1$^c$ represent detail views. Fig. 2 represents a side elevation of the machine, looking in the direction of the arrow 4 in Fig. 1. Figs. 2$^a$ and 2$^b$ represent detail views. Fig. 3 represents a side view of the side opposite that shown in Fig. 2. Figs. 3$^a$ and 3$^b$ represent sectional views of parts of the machine hereinafter referred to. Fig. 4 represents an enlarged view, partly in section, of a portion of Fig. 3, showing some of the parts in a different position. Figs. 4$^a$, 4$^b$, and 4$^c$ represent detail views. Fig. 4$^d$ represents a section on line 4$^d$ 4$^d$, Fig. 4. Fig. 6 represents a horizontal section on the line 6 6 of Fig. 4. Figs. 6$^a$, 6$^b$, 6$^c$, 6$^d$, and 6$^e$ represent detail views. Fig. 7 represents a sectional view of a portion of the machine on the line 7 7, Fig. 2, looking downwardly. Fig. 8 represents a sectional detail view on the line 8 8 of Fig. 6, looking toward the left. Fig. 9 represents a view similar to Fig. 8, showing the parts in a changed position and to be hereinafter explained. Fig. 10 represents a horizontal section on line 10 10 of Fig. 9, looking downwardly.

The same letters of reference indicate the same parts in all the figures.

Figures 1, 5:
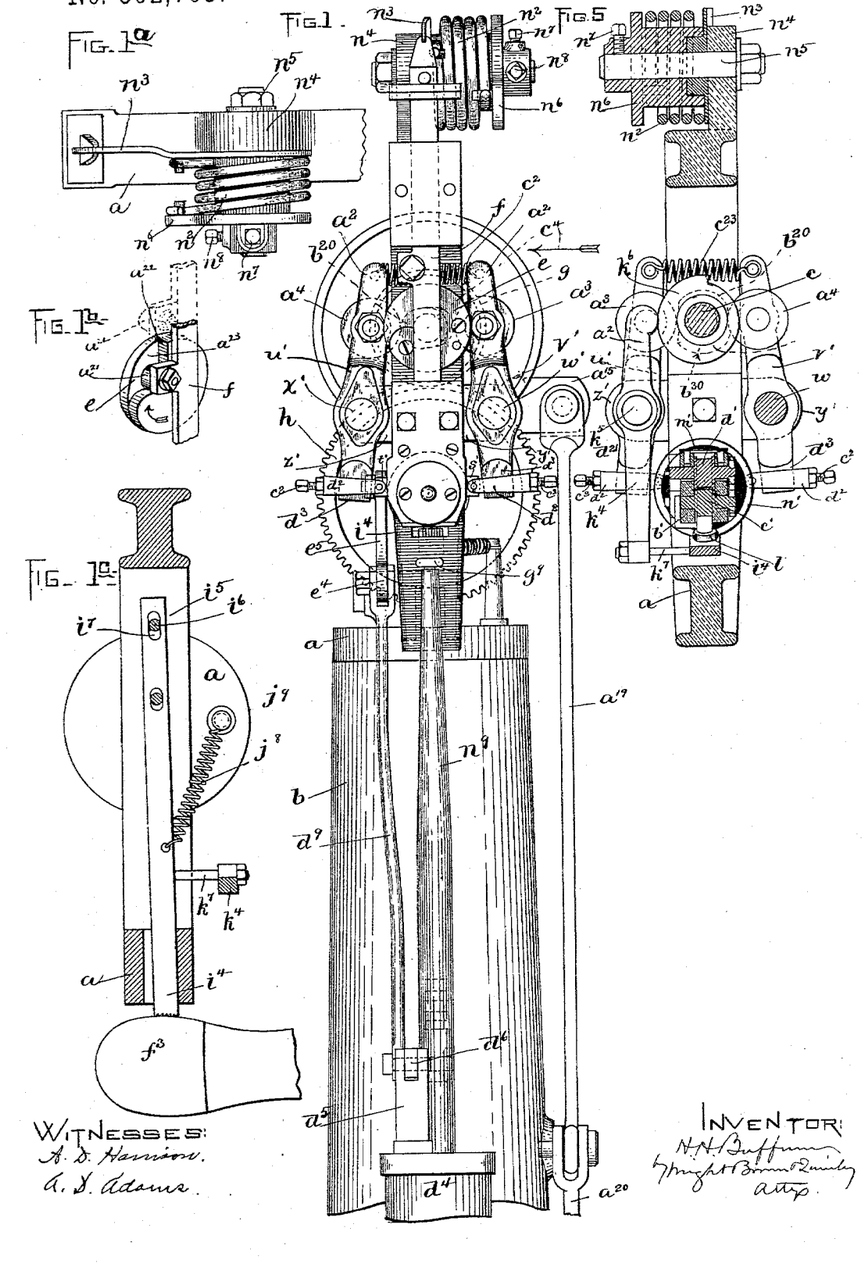
Figure 1 represents a front elevation of a nailing-machine embodying my improvements.
Fig. 5, Sheet 1, represents a section on line 5 5 of Fig. 3.

In the drawings, $a$ represents a supporting frame or head resting upon a support $b$ and suitably secured thereto. Journaled in suitable bearings in the head $a$ is a shaft $c$, having a driving-pulley $d$, which is connected with the shaft by a clutch, (shown at $a^{14}$.) Any suitable clutch adapted to be operated to connect the driving-pulley with and disconnect it from the shaft at the will of the operator may be employed, and said clutch may be operated by a treadle (not shown) attached to an arm $a^{15}$ through suitable connections $a^{19}$ $a^{20}$, Fig. 1. To one end of said shaft is attached a cam $e$, Fig. 1$^b$, which is adapted to alternately raise and release a spring-depressed driver-bar $f$ at each rotation of the shaft $c$, said cam having a recess $a^{23}$ and a raised portion $a^{22}$, which coöperate with a roll $a^{31}$ on the driver-bar.

The rear end of the shaft $c$ is provided with a gear $g$, which meshes with a gear $h$, secured to a shaft $i$, journaled in suitable bearings in the head $a$. The gears $g$ $h$ are so formed that one rotation of the gear $g$ imparts a one-half rotation to the gear $h$, the gear $h$ being provided with twice as many teeth as the gear $g$, so that the shaft $i$, which carries the nail-strip $o$ and is connected with the mechanism which feeds the strip to the cutting mechanism, imparts a half-rotation to the said feeding mechanism and strip after the formation of each slug, to the end that the slugs may be given a tapering form, as hereinafter described.

Figures 2, 2A, 2B:
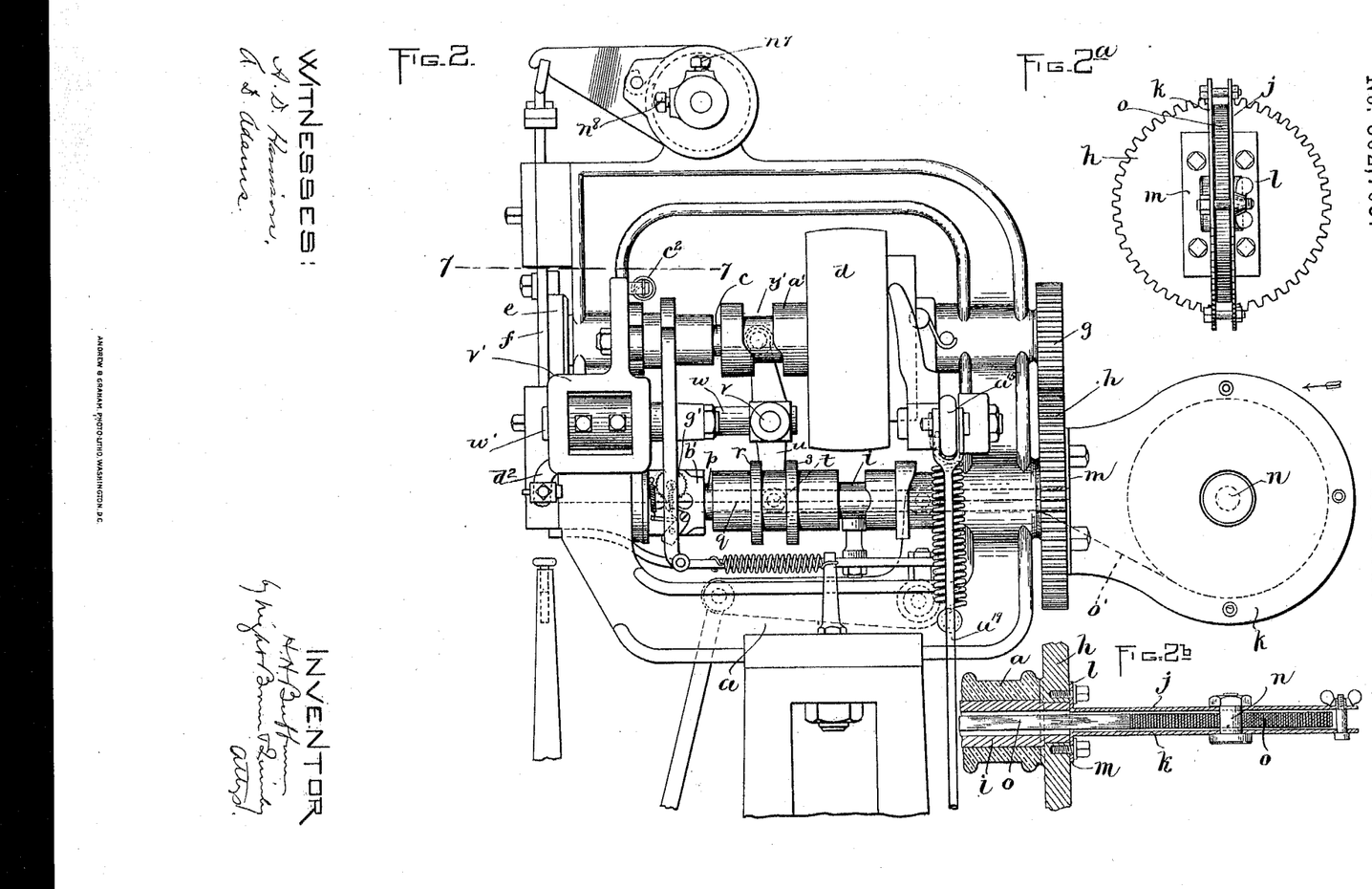

To the gear $h$ is secured a slug-strip holder, shown in Figs. 2$^a$ and 2$^b$ as composed of two side pieces $j$ $k$, provided with flanges $l$ $m$, bolted to the gear $h$, and a stud $n$, supporting the coiled strip $o$.

Figures 4, 4B, 4C, 4D:
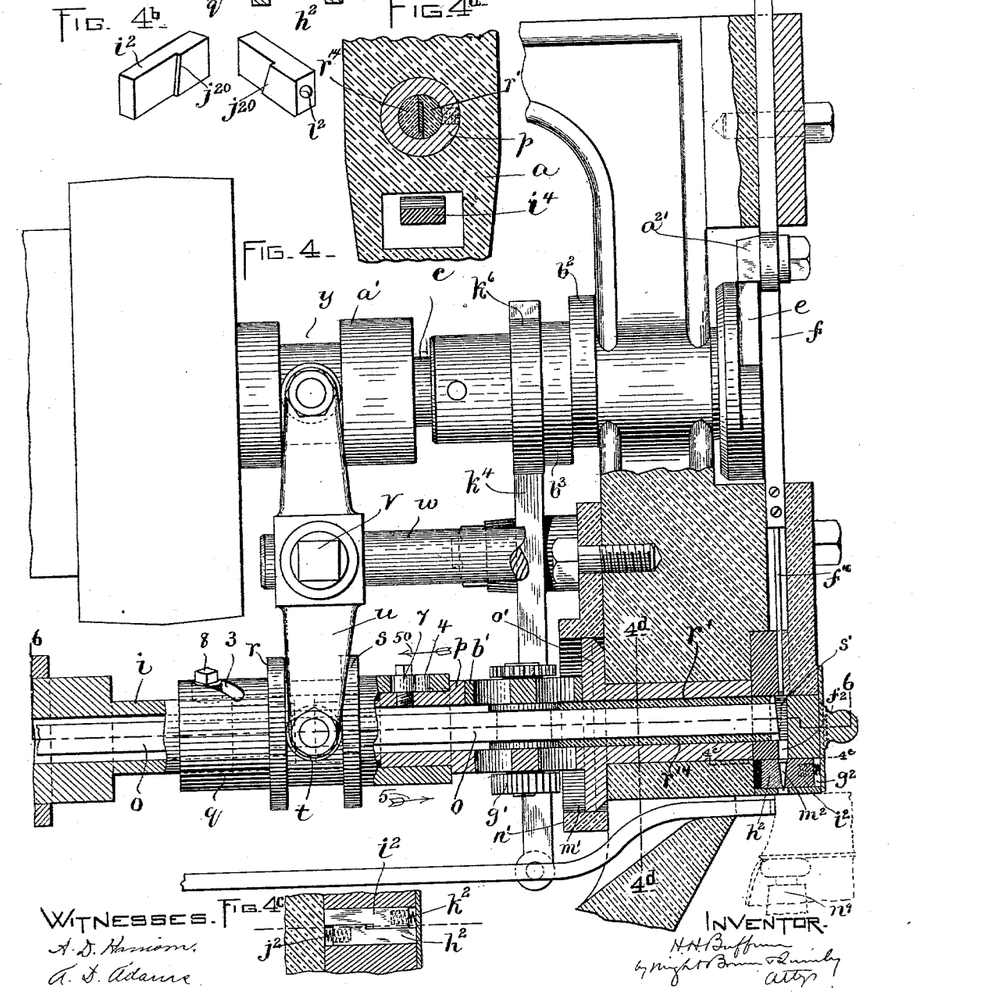
Figure 4A:
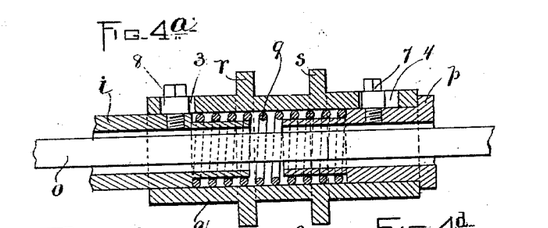

The shaft $i$ is hollow, to permit the passage of the strip through it to the feeding mechanism, and from thence to the cutting and driving mechanism. The feeding mechanism is carried by another hollow shaft $p$, which is in line with the shaft $i$, the strip passing through both shafts. The shafts $i$ and $p$ are connected by means of a sleeve $q$, which surrounds the shafts near their adjacent ends and communicates rotary motion from the shaft $i$ to the shaft $p$ through studs 7 and 8, secured to the shafts, and slots 3 4 in the sleeve $q$, and is longitudinally reciprocated, so that it imparts longitudinal movement to the shaft $p$ and the feeding mechanism hereinafter described. A spring 9, Fig. 4ª, is interposed between the shafts inside the sleeve, and acts to press the shaft $p$ against its fixed abutment when the said shaft is at the forward end of its movement, as hereinafter described. The slot 4 is straight, while the slot 3 is inclined, the object of this form of the slots being hereinafter explained.

Figure 11:
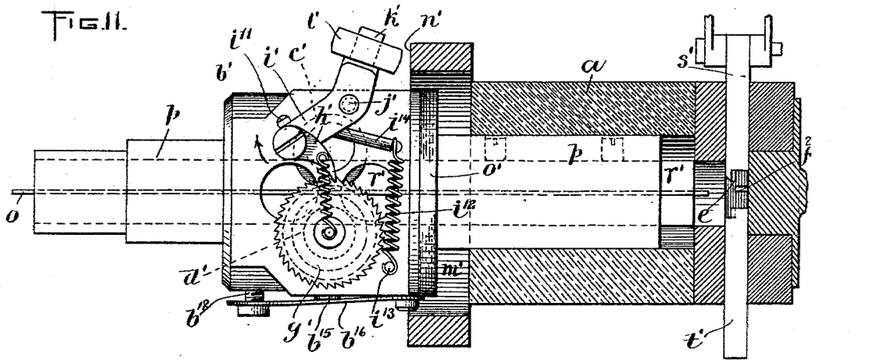
Figs. 11 to 18, inclusive, represent detail views hereinafter explained.
Figure 12:
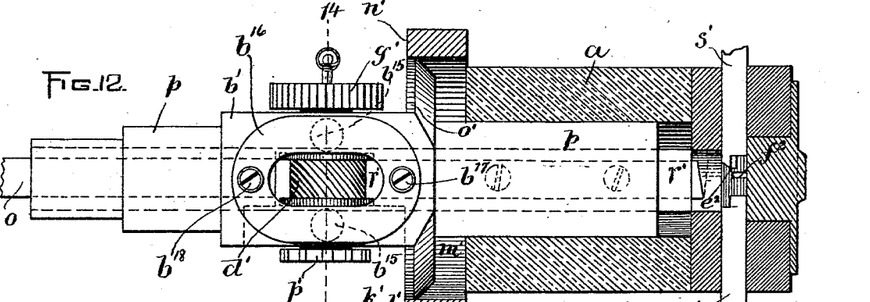

The sleeve $q$ has flanges $r$ $s$, which engage a roll $t$, mounted on a lever $u$, which is pivoted at $v$ to a fixed arm $w$. The upper end of said lever is engaged with a cam-groove $y$ in a cam-sleeve $a'$ upon the shaft $c$, said cam-groove and lever reciprocating the sleeve $q$ and the tubular shaft $p$. The shaft $p$ is provided with an enlarged head or holder $b'$ for the strip-feeding mechanism, which comprises two rolls $c'$ $d'$, Figs. 11 to 18, which are rotatable in said holder and have their journals $e'$ $f'$ connected by gears $p'$ $q'$, Fig. 14. To the journal $f'$ is secured a ratchet $g'$, Fig. 11, which is engaged by a pawl $h'$, mounted on an arm $i'$, which is pivoted at $j'$ to the holder $b'$. The arm $i'$ has a journal $k'$ formed upon its outer end, upon which is mounted a roller $l'$, arranged to strike the face $m'$ of a fixed annular abutment $n'$, which receives a flange $o'$ on the shaft $p$. This contact of the roll $l'$ with the face of the socket causes the arm $i'$ to swing on its pivot and move the pawl $h'$ in the direction required to rotate the ratchet $g'$ in the direction of the arrow marked thereon in Fig. 13, the feed-rolls being thus caused to move the strip $o$ forward to the cutters hereinafter described. The feed-roll $c'$ has no lateral play in its bearings, while the roll $d'$ has a limited lateral play, and is pressed against the strip $o$ by means of a spring $b^{16}$, Figs. 12 and 14, secured at $b^{17}$ to the holder $b'$, and pins $b^{14}$ $b^{15}$, interposed between said spring and the journals of the roll $d'$ and communicating to the latter the pressure of the spring, which may be varied by an adjusting-screw $b^{18}$.

The shaft $p$ is provided at one side of the feed-rollers with a quill $r'$, which is formed to fit the strip $o$ and support the same between the feed-rolls and the cutters $s'$ $t'$, the outer end of the quill resting against the cutters when they are severing the strip.

Figures 6, 6A, 6B, 6C, 6D, 6E, 7, 8, 9, 10:
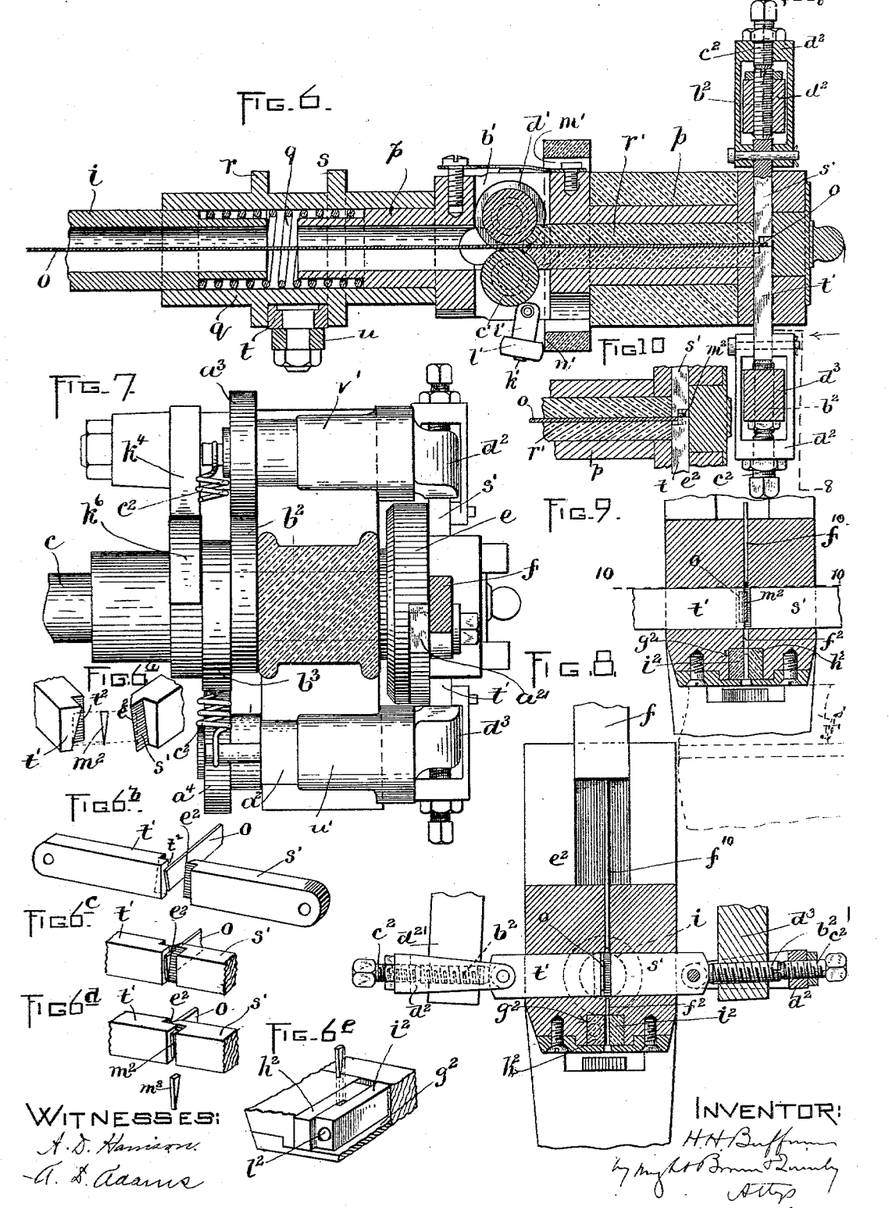

The cutters $s'$ $t'$ are movable in guides or ways in the supporting-frame, and are reciprocated in opposite directions by power communicated from the driving-shaft through cams $b^{20}$ $b^{30}$, Figs. 1 and 5, on said shaft, yokes $u'$ $v'$, pivoted, respectively, at $x'$ $w'$ to lugs $z'$ $y'$, Fig. 5, on the supporting-frame, and provided with rolls $a^4$ $a^3$, which are mounted on arms $a^2$ $a^2$ on said yokes and are pressed by a spring $c^{23}$ against said cams, arms $d^{21}$ $d^3$, formed on said yokes, screws $b^2$ $b^2$, Fig. 8, in said arms bearing on the cutters $s'$ $t'$, and links $d^2$ $d^2$, Fig. 8, pivoted to the outer ends of the cutters and having screws $c^2$ $c^2$, bearing on the outer ends of the screws $b^2$. The knives are forced inwardly to cut the strips by the positive action of the cam on the screws $b^2$ $b^2$ through the intermediate connections, and are retracted by the action of the spring $c^{23}$ through the same connections, and the links $d^2$ $d^2$.

The cutters are formed with inclined cutting edges $e^2$ $t^2$, as shown in Figs. 6ª and 6ᵇ, so that each cut leaves an inclined end on the strip $o$, as shown in Figs. 4, 12, 15, and 18. The cutters are arranged so that each slug $m^2$ severed from the strip drops into a recess $f^2$, Fig. 4, where it is held by centering-jaws $h^2$ $i^2$ in the path of the driver $f^{10}$. The centering-jaws are formed with inclined shoulders $j^{20}$ $j^{20}$, Fig. 4ᵇ, so that a tapering cavity exists between them, formed to receive a tapering or wedge-shaped slug. The jaws are held yieldingly in place against fixed supports by springs $j^2$ $k^2$, Fig. 4ᶜ, so that they separate when the driver descends to drive the slug.

The driver is forced downwardly to drive the slugs by a helical spring $n^2$, one end of which is secured to an arm $n^3$, bearing upon the driver-bar, while the other end is secured to a collar $n^6$, adjustably secured by set-screws $n^7$ $n^8$ to a stud $n^5$, affixed to the supporting-frame. Said collar and set-screws permit any desired adjustment of the tension of the spring.

Figures 3, 3A, 3B:
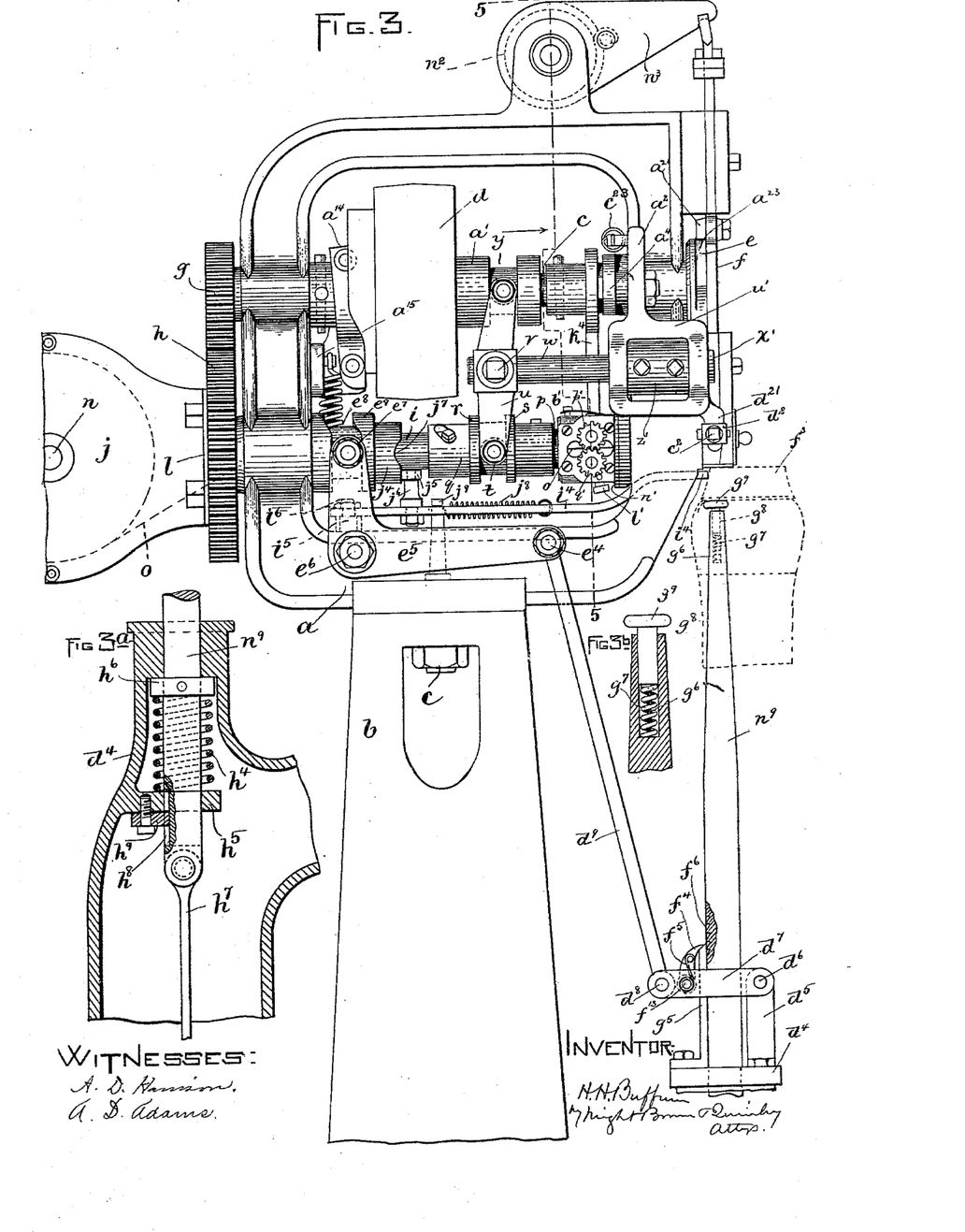

In Fig. 3, I have shown means for automatically forcing the work-supporting horn $n^9$ upwardly toward the nail-delivering throat while the nail or slug is being driven, the horn being released at other times, so that it may be normally supported by a light spring and readily moved by the operator. Said means comprise a standard $d^5$, to the upper end of which is pivoted at $d^6$ an arm $d^7$. Said arm is connected at $d^8$ to a rod $d^9$, the upper end of which is pivoted at $e^4$ to a bell-crank lever $e^5$, said lever being pivoted at $e^6$ to the frame $a$. The upper end of said bell-crank lever is provided with a roller $e^7$, which enters a cam-groove $e^8$ in a cam-disk $e^9$, secured to the shaft $i$. To the arm $d^7$ is pivoted at $f^{13}$ a pawl $f^4$, pressed toward the horn by a spring $f^5$, which causes the pawl to engage teeth $f^6$, formed upon the horn, when the pawl is raised by the action of the cam-groove upon the bell-crank lever, this movement taking place before the nail is driven. The pawl therefore forces the horn upwardly, and holds it in position to firmly hold the heel while the nail is being driven. After the nail has been driven, the pawl is disengage from the horn by the downward movement of the bell-crank lever, which lowers the pawl until the upper end of the latter comes in contact with a knock-off $g^4$, consisting of an upwardly-extending standard $g^5$, secured to the horn-support and formed to displace the pawl when the latter is being moved downward, and thereby disengage the pawl from the horn, as shown in Fig. 3.

The tip or anvil $g^9$ of the horn is yieldingly supported by a relatively stiff spring $g^7$, Fig. 3ᵇ, which imparts a yielding quality to the upward pressure exerted on the horn as above described. The horn is yieldingly supported by a relatively light spring $h^4$, Fig. 3ª, the bottom of which rests upon a support $h^5$ in the horn-support $d^4$, the upper end bearing against a collar $h^6$ upon the horn. The lower end of the horn is provided with a rod $h^7$, connected with a suitable treadle, (not shown,) by which the operator may depress the horn when the machine is at rest.

To prevent the horn from rotating, a slot $h^8$ is formed in the lower end thereof, into which projects a spline $h^9$, secured to the under side of the spring-support $h^5$.

$i^4$ represents a feed-dog, the outer end of which projects through the frame $a$, so that the work may be held against it by the operator. The inner end of the feed-dog rests upon a suitable support $i^5$, which is provided with a stud $i^6$, projecting through a slot $i^7$ in the feed-dog, to permit longitudinal movement of the latter, the top of the stud being provided with a nut $i^{60}$ to prevent displacement of the feed-dog. To effect a longitudinal movement of the feed-dog, a cam $j^4$ on the shaft $i$ is provided, against the face of which is pressed, by a spring $j^8$, a roll $j^5$, journaled upon a stud $j^6$, which is adjustably secured to the feed-dog, one end of said spring being secured to the feed-dog and the other to a standard $j^9$, secured to the frame $a$. A lateral movement is imparted to the feed-dog by a lever $k^4$, pivoted at $k^5$ to a support attached to the frame. The upper end of the lever engages a cam $k^6$ upon the shaft, (see Fig. 2,) and the lower end is provided with a projection $k^7$, which engages the edge of the feed-dog, the latter being held in contact with the cam by the spring $j^8$, which stands at such an angle to the feed-dog that tension is exerted both laterally and longitudinally.

Figures 13, 14, 15:
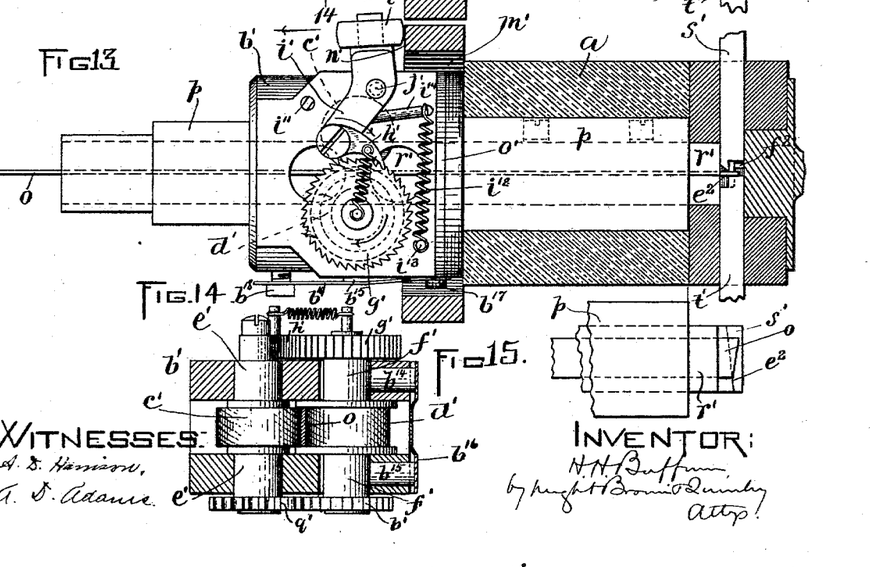
Figures 16, 17, 18:
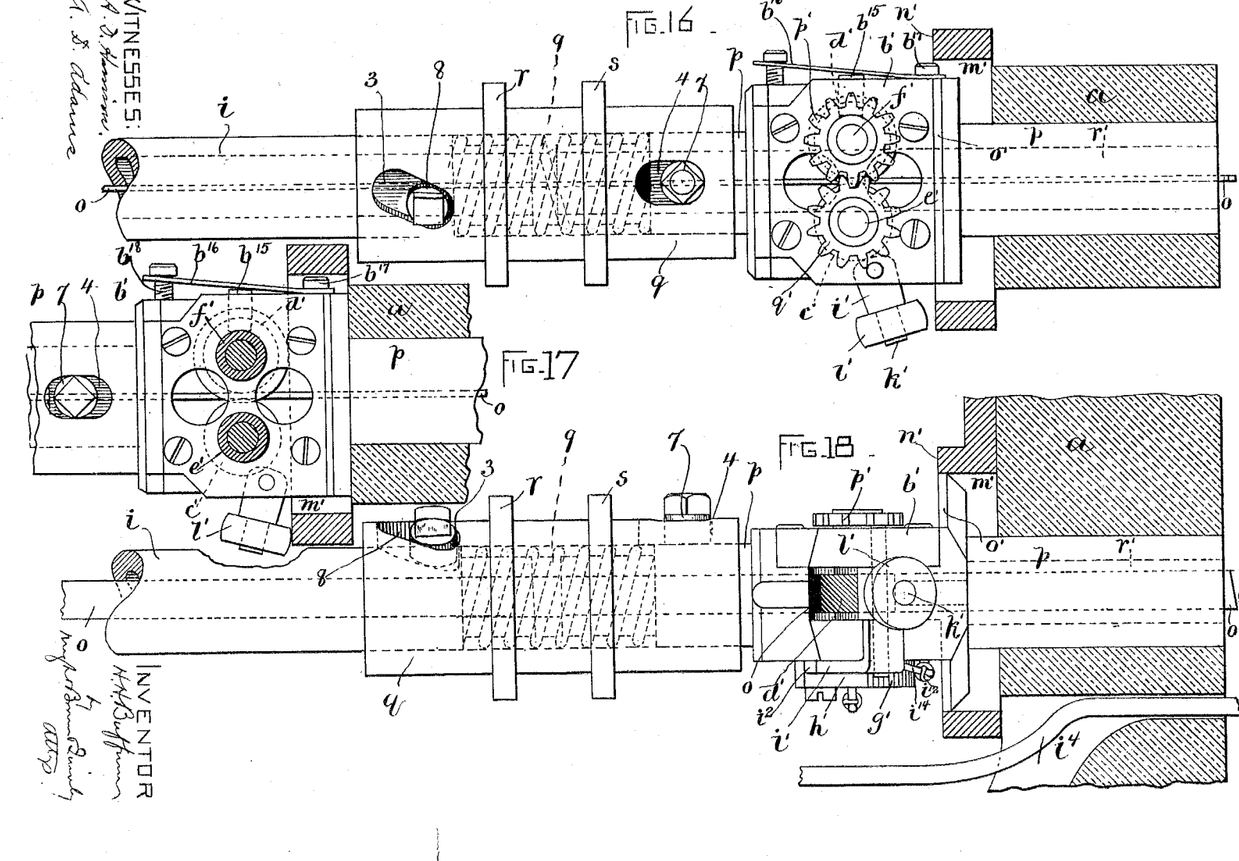

The operation is as follows: While the driver is rising and its cutters are being retracted to the position shown in Fig. 11, the sleeve $q$ is moved in the direction indicated by the arrow 5 in Fig. 4, and moves the head $b'$ and its adjuncts forward. The roll $l'$ on the arm $i'$ is thus caused to strike the abutment $n'$, the pawl $h'$ being thus moved to partially rotate the feed-rolls, thus advancing the strip between the cutters, as shown in Figs. 13 and 15, the strip remaining in this position while the cutters are severing it. By reference to Fig. 15 it will be seen that the inclination of the cutting edges of the cutters is such that after each cut the inclination of the end of the strip, which will then be on the line of the cutting edge $e^2$, makes the lower edge of the strip in advance of the upper edge. Here it should be noticed that after each cutting operation the strip is retracted and is given a half-rotation, so that the inclination of its outer end, when it is held in position for the action of the cutters, is always such that the upper edge is in advance of the lower edge, as shown in Fig. 15. This inclination of the cutting edges of the cutters, together with the half-rotation of the strip after each cut, causes the formation of a tapering or wedge-shaped slug $m^2$, having a penetrating point and a head of the elongated form desirable in heel-slugs. The cutters are timed so that when they are in the position shown in Fig. 13 the cutter $s'$ stops with its recess over the nail slot or throat $f^2$, the cutter $t'$ advancing and pushing the severed slug over said throat, into which it drops and is held as described by the centering-jaws. The sleeve $q$ commences to move backwardly in the direction indicated by the arrow 50, Fig. 4, during the cutting operation, this movement being preparatory to retracting the strip $o$ from the cutters, in order that it may receive another half-rotation before it is again fed forward. The sleeve does not, however, move the shaft $p$ and the feeding mechanism during the first part of its backward movement, but leaves said parts at rest during the cutting operation. This result is due to the form of the slots 3 4 and to the coöperation with said slots of the studs 7 8. As above stated, the rear end of the slot 4 bears against the stud 7 at the end of the feed movement of the strip, so that when the sleeve $q$ commences to move backwardly it has a lost motion, corresponding to the distance between the stud 7 and the forward end of the slot 4. Hence the shaft $p$ and the feeding mechanism receive no backward movement until the forward end of the slot 4 strikes the stud 7, after which the said shaft and feeding mechanism are moved backwardly by the sleeve and retract the strip from the cutters. It is necessary also to stop the rotation of the shaft $p$ and of the strip, or that part thereof that is presented to the cutters during the cutting operation. This result is secured by the inclination of the slot 3, which is such as to compensate for the continuous rotary movement of the shaft $i$ and stud 8, and permit the sleeve to move on the shaft $i$ without receiving rotary movement therefrom during the period of lost motion of the sleeve on the shaft $p$. After said period, the sleeve $q$ imparts both endwise and rotary motion to the shaft $p$, the strip being thus retracted and partially rotated, the rotary movement continuing until the completion of the forward movement of the sleeve and of the feed movement of the strip. The retraction of the shaft $p$ carries the feed mechanism away from the abutment $n'$, so that the pawl $h'$ and arm $i'$ are free to be restored by a spring $i^{12}$ to the feeding position shown in Fig. 11, said spring being connected at one end to a stud $i^{13}$ on the holder $b'$, and at its other end to a pin $i^{14}$, affixed to the arm $i'$. A stop $i^{11}$ limits the movement of the arm $i'$ by the spring.

It will be seen that by giving the nail-strip a half-rotation after each cut I am enabled to make nails or slugs with elongated heads and penetrating points from a plain strip without previously cutting the strip to partially form the nails or slugs. By the employment of a continuously-rotated shaft as the motor for the head or holder of the feed mechanism I am enabled to operate the machine much more rapidly than would be possible if the strip were rocked or given a half-rotation first in one direction and then in the opposite direction, as is common in tack and cut-nail machines, where there is much loss of time due to the stoppage and reversal of the motion of the strip. This loss of time I entirely avoid by the continuous rotation of the tubular shaft or motor that is geared to the driving-shaft. The continuous rotation of said shaft or motor necessarily involves a slight twisting of the strip while the latter is held stationary for the action of the cutters, but this twisting is not sufficient to be a matter of any consequence.

I do not limit myself to the details of mechanism herein shown and described, and may variously modify the same without departing from the spirit of my invention.

I claim—

1. In a machine of the character specified, the combination of a driver, strip-cutters, a driving-shaft, intermediate connections for imparting motion from the shaft to the driver and the cutters respectively, a rotary head or holder provided with strip-feeding devices, and intermediate connections between the shaft and holder having provisions for imparting a progressive rotary motion from the shaft to the holder.

2. In a machine of the character specified, the combination of a driver, strip-cutters, a driving-shaft, intermediate connections for imparting motion from the said shaft to the driver and the cutters respectively, a rotary head or holder provided with strip-feeding devices, intermediate connections between the shaft and holder whereby a progressive rotation is imparted from the shaft to the holder to present the strip in different positions to the cutters, and means operated by the rotation of the head for operating the strip-feeding devices.

3. In a machine of the character specified, the combination with a driving mechanism and a cutting mechanism, of a rotary head or holder provided with strip-feeding devices, a continuously-rotated shaft or motor through which the strip passes to the feed mechanism, a reciprocating connecting device between the said motor and holder having provision for transmitting rotary motion from the motor to the holder and for imparting an independent back-and-forth motion to the holder.

4. In a machine of the character specified, the combination with a driving mechanism and a cutting mechanism, of a rotary head or holder, strip-feeding mechanism carried thereby, a continuously-rotated shaft or motor through which the strip passes to the feed mechanism, a movable connecting device between the said motor and holder having provision for transmitting rotary motion from the motor to the holder and for imparting an independent back-and-forth movement to the holder, and mechanism for reciprocating said connecting device, the latter also having provision for a limited longitudinal movement independent of the rotary movement of the motor and without moving the holder and feed mechanism.

5. In a machine of the character specified, the combination with a driving mechanism and a cutting mechanism, of a rotary head or holder, a continuously-rotated shaft or motor, a reciprocating connecting device between the motor and holder having provision for transmitting rotary motion from the motor to the holder and for imparting independent endwise movements to the holder, a fixed abutment in the path of said holder, and strip-feeding mechanism carried by the holder and having a part which is caused to strike said abutment and operate the feed mechanism by an endwise movement of the holder.

6. In a machine of the character specified, the combination of a driving mechanism including a driving-shaft, a cutting mechanism operated thereby, a strip-rotating shaft or motor, gearing connecting the motor with the driving-shaft and adapted to rotate the motor at half the speed of the shaft, a rotary head or holder having strip-feeding mechanism, and a connecting device between the motor and holder having provision for transmitting rotary motion to the holder and for imparting independent endwise movements to the holder.

7. In a machine of the character specified, the combination of a driving mechanism including a driving-shaft, a cutting mechanism operated thereby, a tubular shaft or motor geared to the driving-shaft to rotate at half the speed of the latter, a strip-holder secured to said shaft, a rotary head or carrier in line with said tubular shaft, a sleeve having a straight slot engaged with a stud on the holder and an inclined slot engaged with a stud on the tubular shaft, mechanism for reciprocating said sleeve, and feed mechanism carried by the holder.

8. In a machine of the character specified, the combination of a driving mechanism, a cutting mechanism, a rotary shaft or motor connected with the driving mechanism, a rotary head or holder, a positively-reciprocated connecting device between said holder and motor, feed-rolls journaled in the holder, one of said rolls being yieldingly mounted, an external feed-roll-operating device on the holder, and a fixed abutment adapted to coöperate with said operating device.

9. In a machine of the character specified, the combination of a supporting-frame having a fixed nail-guiding throat, a driver movable in said throat, two opposed cutters having inclined cutting edges, one of said cutters being recessed to form a guide arranged to deliver a nail to said throat, strip-feeding devices, a rotary head carrying said devices, a rotary driving-shaft, and intermediate connections for imparting motion from said shaft to the driver, the cutters, and the head, respectively, the said head having provisions for imparting strip-feeding movements to the said feeding devices.

10. In a machine of the character specified, the combination of a driving mechanism, a cutting mechanism, a nail-guiding throat located below the cutting mechanism and arranged to receive nails therefrom, and spring-pressed centering-jaws in said throat, said jaws being pressed independently in opposite directions against fixed supports and provided with shoulders which coöperate to form an expansible nail-receiving cavity.

11. In a machine of the character specified, the combination with a supporting-frame having a nail-delivering throat, a driving mechanism on said frame, a work-supporting horn movable toward and from the throat, an oscillatory arm adjacent to the horn, means for oscillating said arm, and a pawl on said arm which is engaged with the horn when the arm rises and separated therefrom when the arm descends.

In testimony whereof I have signed my name to this specification, in the presence of two subscribing witnesses, this 31st day of December, A. D. 1895.

HERBERT H. BUFFUM.

Witnesses:
C. F. BROWN,
A. D. HARRISON.